Patented Jan. 1, 1935

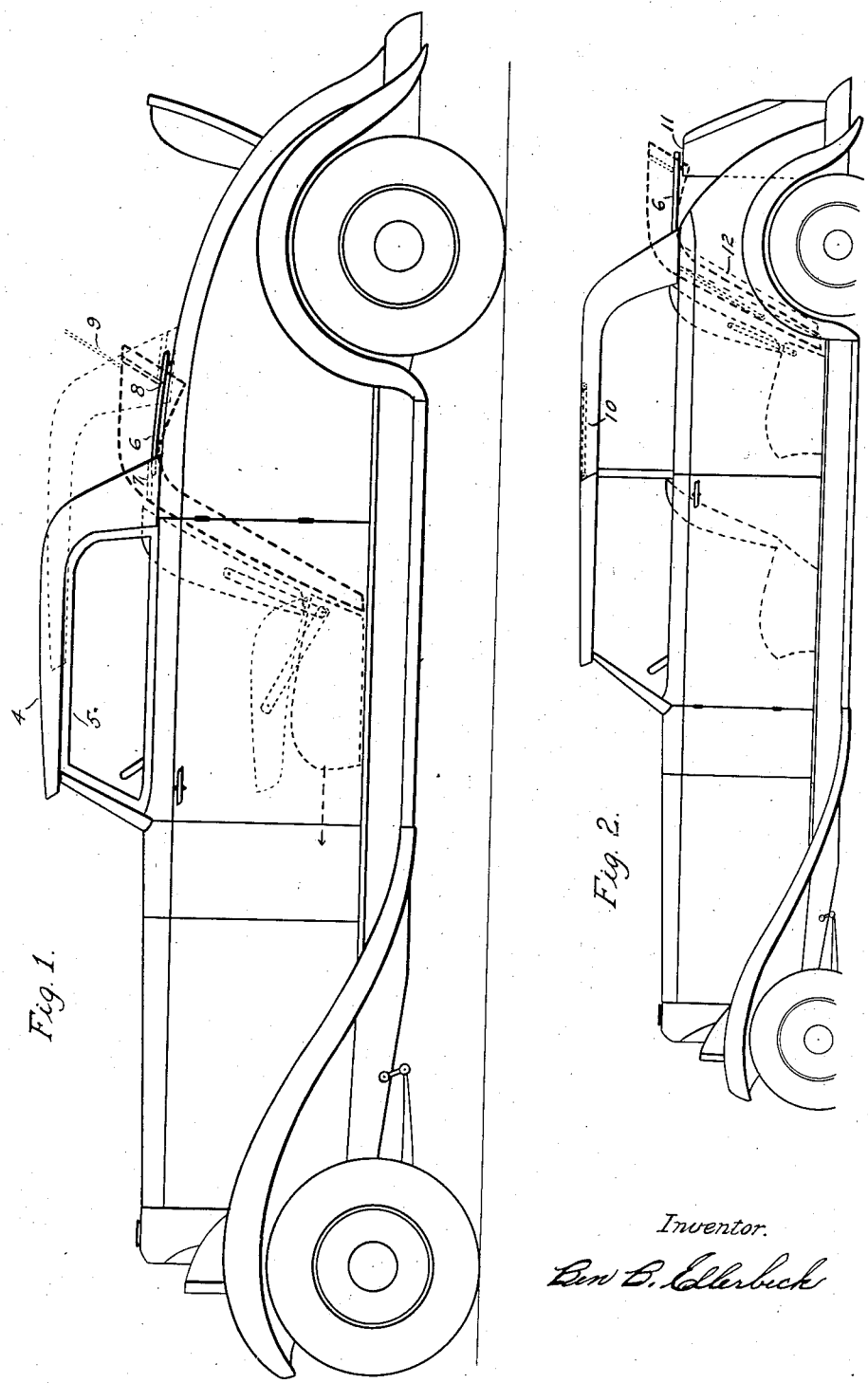

1,986,048

UNITED STATES PATENT OFFICE 1,986,048

CONVERTIBLE AUTOMOBILE TOP

Ben Brown Ellerbeck, Salt Lake City, Utah

Application January 26, 1931, Serial No. 511,355

3 Claims. (Cl. 296—107)

My present invention relates to automobile tops, especially of the rigid or fixed-shape type as distinguished from flexible foldable tops, and has for an object the provision of an arrangement, primarily for the roadster type of body and secondarily for the close-coupled phaeton body, whereby the rigid top may be easily moved from the position where it serves as a cover for the seating compartment to a position directly in rear of this compartment, so that the roof portion of the top is disposed in the body and the rear quarter of the top extends across the deck surface in the same position and providing approximately the same general appearance as a folded roadster or phaeton top. A second object is to provide a fixed-shape lowerable top which takes up very little space for housing in the body and hence may be used on short wheel-base cars. Another object is to provide a lowerable top the rear quarter of which is wider at its base than the body opening so that when the top is in normal raised position its base will rest on the body surface and allow adequate means for a water tight junction between the top and body. A further object is to provide means whereby the rear window of the top may be made to serve as a rear windshield when the top is in lowered position.

This convertible top is distinguished from other fixed-shape lowerable tops by being disposed, when down, with the front end downmost in the body. Since an automobile body is narrowest at the bottom, and since automobile tops are narrowest at the point of fastening to the windshield and widest at the base of the rear quarter, it is most practical to dispose a rigid lowerable top by putting the narrowest portion down into the narrowest part of the body and permit the widest portion of the top to remain out of the body. By reason of this, a top in keeping with conventional shape may be thus lowered. This top construction and its disposition is extremely simple since it is free from such complication as hinged, pivotal or swinging-arm connections with the top. Lastly, this top serves to retain the characteristic appearance of coupe tops when it is in normal raised position, and when it is lowered it very closely approximates the rakish appearance of a folded cloth roadster top. This is also the case when this top is in the lowered position on a phaeton body. These are important considerations in convertible top construction.

The preferred manner of carrying out this invention is illustrated in the accompanying drawing, in which:

Figure 1 is a side view of an automobile of the roadster type equipped with my type of rigid top, the latter being illustrated in the normal raised position by full lines, in intermediate position by light dotted lines, and in a final lowered position by heavy dotted lines.

Figure 2 shows my type of top in the raised and lowered positions on a phaeton type of automobile body.

Referring to Fig. 1, the top 4 is shown in full lines in place above the driving compartment of a roadster type automobile, the door windows 5 being racked up, and the car thus serving as a closed coupe. Rearward of the top are two parallel tracks 6 fastened to the deck surface and extending through the lower rear edge of the top, and contacting with the lower surface of a transverse shelf 7 attached to the top. To lower the top and thus convert the coupe into an uncovered or open roadster, it is pushed rearwardly on the tracks until the rear wall of the top is beyond their ends and only the shelf 7 bears on them, it then being free to be tilted down into the body. The forward edge of the shelf will contact with slight notches 8 in the tracks during the tilting of the top to final lowered position. The seat must be moved forward momentarily to allow clearance for the top during the lowering movement. Any means for tilting down the seat-back and sliding the seat forwardly may be employed. A practical method of lowering the seat-back so that the whole unit will slide under the steering wheel is indicated in the drawing. Other means of getting the seat out of the way would be to divide the seat into two seats, these being slidable or foldable sidewise when the car doors were thrown open. When the top is tilted down to final lowered position, it occupies the position indicated in heavy dotted lines, the leading edge of the top being adjacent to the floor of the car, and the rear quarter of the top projecting out of the body where it lies closely to the deck surface and overhangs the edges by reason of being wider than the deck is at this point. When the seat is returned to position, the car embodies the rakish appearance of a conventional open roadster. Since it is customary to equip roadster bodies with deck seats, it is desirable to provide a windshield for deck passengers. This convertible top gives a ready means for supplying such a windshield for the open car. By hinging the rear window of the top at its lower edge, this window may be swung open and positioned as a windshield. This position of the rear window is indicated at 9 with light dotted lines.

Referring now to Fig. 2, the same disposition of a top of my construction is shown in respect to a phaeton type of body. The top must be in two sections, these being detachable from each other or so hinged that the forward section may be swung back under the roof of the rear section. This latter method is indicated in the drawing by the hinged connections 10. In order to allow proper anchorage for the tracks on which the top is displaced rearwardly, these tracks 6 are shown as resting on a trunk 11 set into the rear of the phaeton body. This allows the tracks to be approximately horizontal without being bracketed up from the rear body surface. The top is shown in full lines as a cover for the seating compartment and in heavy dotted lines in the lowered position, the front section swung under the rear section and indicated in light dotted lines at 12.

The rear displacement of this top before it is lowered into the body makes it practical for both the roadster and the phaeton types of body. The side-walls of the rear quarter of the top converge slightly toward the top or roof surface. This convergence together with the narrowing in of the sides toward the front allows the necessary clearance to house a top of this nature in the manner explained. Slight changes may be made in contour of the top, and various methods used to give it the primary rear displacement without departing from the spirit of this invention.

I claim:

1. In combination with an automobile body having a driving compartment, a non-deformable top having a roof portion and a rear wall portion incorporating a transverse hinged window, said top being detachable from its normal position as a cover for the driving compartment and disposable in the body so that the roof portion is concealed within the body while the rear wall portion projects out of the body and serves to approximate in general appearance and position the folded cloth tops of roadster or phaeton type, and provides a ready means for a rear windshield by opening the said transverse window to a suitable angle.

2. In combination with an automobile body of the general roadster type having a deck surface rearward of a driving compartment provided with a forwardly movable seat, a rigid top consisting of a roof portion immovably fastened to a rear wall portion, which incorporates a transverse shelf near its base, and parallel tracks on the deck surface extending rearwardly from the bottom of this base shelf, upon which tracks the top is slidable rearwardly along the said deck surface and forwardly tiltable on the front edge of the transverse shelf to a position between the movable seat and the deck compartment, in which position the roof portion of the top is within the body and the rear wall portion of the top lies horizontally adjacent to the outer surface of the deck, thus converting the body to an uncovered structure.

3. In combination with an automobile body of the general roadster type having a deck compartment rearward of a driving compartment provided with a forwardly movable seat, a rigid top consisting of a roof portion immovably fastened to a rear wall portion, said top being lowerable into the body between the deck compartment and the seat by bodily displacing the top backwardly on supports between it and the body, and then tilting the top forwardly until the roof portion is in the body in front of the said deck compartment, and the rear wall portion lies in a substantially horizontal position adjacent to the upper surface of the said deck compartment.

BEN B. ELLERBECK.